United States Patent
Focke et al.

(10) Patent No.: US 6,170,766 B1
(45) Date of Patent: Jan. 9, 2001

(54) VALVE, IN PARTICULAR GLUE VALVE

(75) Inventors: Heinz Focke; Harald Gosebruch, both of Verden (DE)

(73) Assignee: Focke & Co. (GmbH & Co.), Verden (DE)

(*) Notice: Under 35 U.S.C. 154(b), the term of this patent shall be extended for 0 days.

(21) Appl. No.: 09/199,418

(22) Filed: Nov. 25, 1998

(30) Foreign Application Priority Data

Nov. 25, 1997 (DE) .............................. 197 52 150

(51) Int. Cl.[7] ........................................ B05B 1/30
(52) U.S. Cl. .................. 239/585.1; 239/75; 239/584; 251/129.06; 251/129.15
(58) Field of Search .................... 239/75, 102.1, 239/102.2, 463, 472, 492, 583, 584, 585.1–585.4, 587.1; 251/129.06, 129.15; 222/571

(56) References Cited

U.S. PATENT DOCUMENTS

| 4,809,885 | * | 3/1989 | Hayashi et al. | 222/571 X |
| 5,697,554 | * | 12/1997 | Auwaerter et al. | 239/584 X |
| 5,868,375 | * | 2/1999 | Reinicke et al. | 251/129.06 X |
| 5,915,361 | * | 6/1999 | Heinz et al. | 123/467 |

FOREIGN PATENT DOCUMENTS

| 40 20 164 | 1/1992 | (DE) . |
| 43 25 143 | 12/1994 | (DE) . |
| 195 00 706 | 7/1996 | (DE) . |

OTHER PUBLICATIONS

Daniel J. Jendritza, Hartmut Janocha: Smarte Aktoren mit piezoelectriktrischen und magnetostriktiven Festkorperenergiewandlern. In: F & M 102 (1994) 11–12, S.592.
Patent Abstracts of Japan, vol. 199, No. 602, Feb. 29, 1996; & JP 07 259690 A (Unisia Jecs Corp), Oct. 9, 1995.

* cited by examiner

Primary Examiner—Andres Kashnikow
Assistant Examiner—Steven J. Ganey
(74) Attorney, Agent, or Firm—Sughrue, Mion, Zinn, Macpeak & Seas, PLLC

(57) ABSTRACT

Valve, in particular glue valve, having a magnetostrictive actuator (14) for actuating a closure member (15) in consequence of a change in a magnetic field. In order to nullify the effects of uncontrolled changes in length of the actuator (14), in particular in consequence of temperature fluctuations, the actuator (14) is connected to a holder, more specifically a holding block (23), which can be moved with inertia.

12 Claims, 1 Drawing Sheet

VALVE, IN PARTICULAR GLUE VALVE

BACKGROUND OF THE INVENTION

The invention relates to a valve, in particular a glue valve, having an actuator made from magnetostrictive material for actuating a closure member at high-frequency, and having a magnetic field generator, in particular a field coil, assigned to the actuator.

Valves having a magnetostrictive actuator are advantageous chiefly when high-frequency opening and closing movements of the valve are required. An advantageous field of application is a glue valve for applying punctiform glue patterns to packages or blanks for packages. In the production of cigarette packets, above all, there is a need for high-frequency opening and closing movements of a glue valve, because of the high output of the packaging machines.

SUMMARY OF THE INVENTION

The valves so far known, which have a magnetically operable actuator, are problematic with regard to a precise response of the actuator, specifically effective expansion and contraction.

It is therefore the object of the invention to improve valves, in particular glue valves, with regard to the accuracy of the changes in length of the actuator.

To achieve this object, the inventive valve is characterized in that the actuator is connected to a holder which can be moved with high inertia, in particular in the case of thermal change in the actuator.

During the operation of a valve, in particular of a glue valve, thermal fluctuations occurring can impair the positioning accuracy of a conventional actuator.

The temperature fluctuations cause an additional change in length of the actuator which leads to superimposition with the changes in length produced by the magnetic field. In the case of the inventive valve, the influence of the change in length due to heat is eliminated in such a way that this slow change in length produces no effects on the short-term, high-frequency control movements of the actuator.

The actuator is advantageously connected to a movable inertial body which preferably consists of metal and has a high mass. Movements of the inertial body are produced in accordance with the changes in length of the actuator because of thermal influences. The opening and closing movements of the valve are not influenced thereby. The inertial body can advantageously be displaced against elastic pressure, in particular against compression springs.

Another particularity of the invention is the actuation of the actuator by an electrically generated magnetic field. The latter effects a lengthening of the actuator, and thus a movement of the same into the closed position of the valve. In order not to need continuously to energize the field coil in this extended position of the actuator, according to the invention the actuator is assigned a permanent magnet, in particular a tubular permanent magnet, which concentrically surrounds the actuator. Its effect is that the actuator is moved into the closed position when the coil is de-energized, and into the open position when the coil is energized.

BRIEF DESCRIPTION OF THE DRAWINGS

Further details of the invention relate to the arrangement and actuation of the actuator, and to the configuration of the glue valve. An exemplary embodiment of a valve is explained in more detail below with the aid of the drawings, in which.

DESCRIPTION OF PREFERRED EMBODIMENTS

Figure 1:
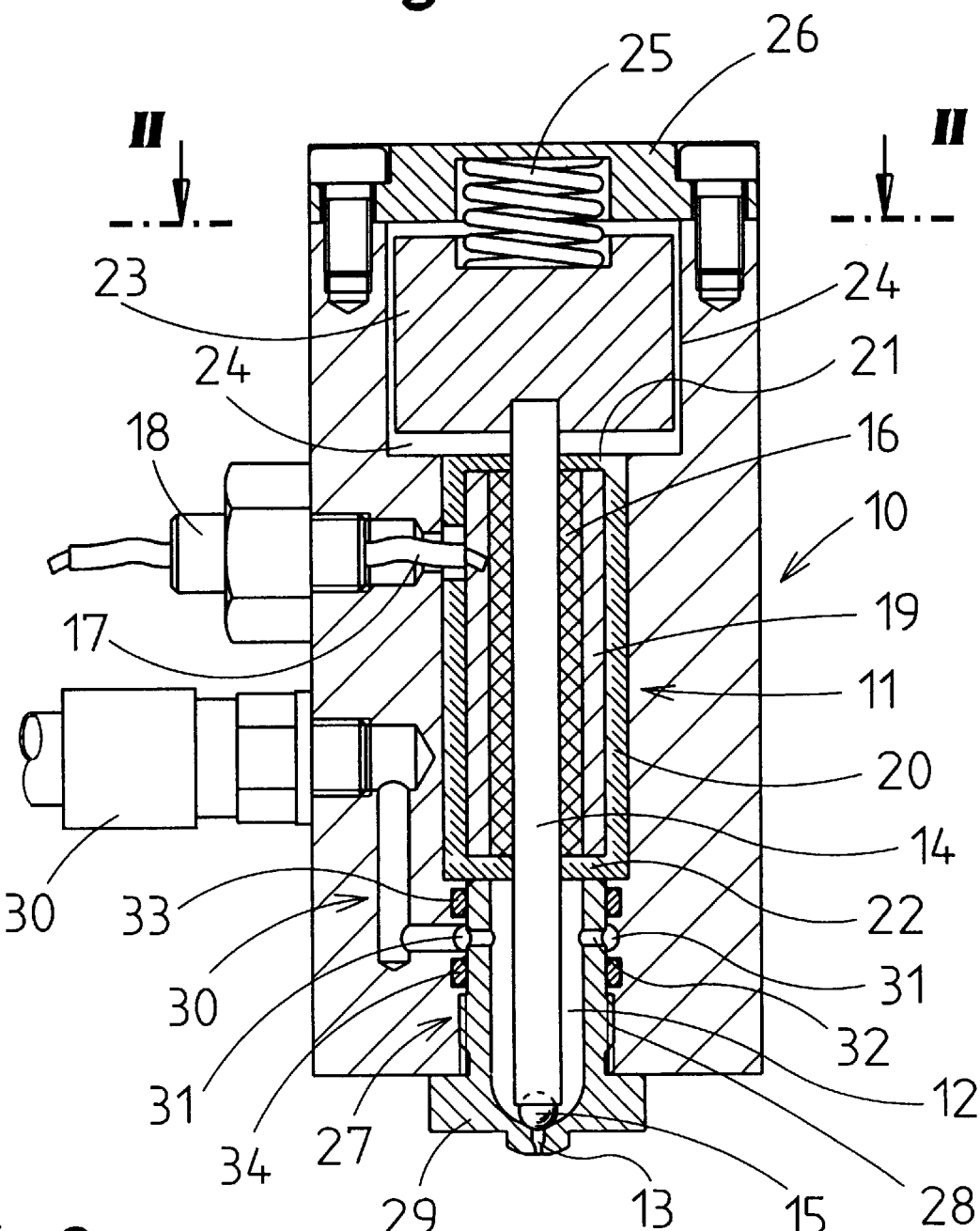
FIG. 1 shows a (glue) valve in vertical section.
Figure 2:
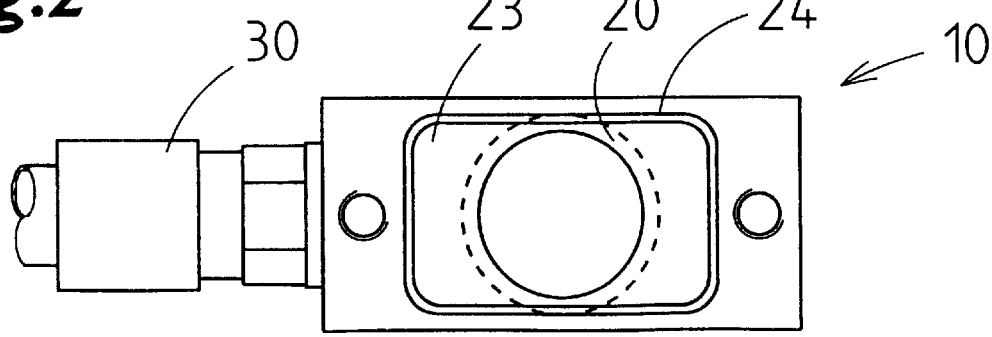
FIG. 2 shows a horizontal section through the glue valve in the plane of section II—II of FIG. 1.

The exemplary embodiment represented in the drawings relates to a valve which can be operated at high-frequency, in particular a glue valve for use in packaging engineering. In the case of the manufacture of cigarette packs, above all, punctiform glue patterns are to be applied at high-frequency to blanks and/or partially finished packs. A glue valve used in this field operates, for example, at a frequency of 1000 cycles per second.

The valve in accordance with FIG. 1 comprises a housing 10 of rectangular cross section. Formed therein is a central inner chamber 11 extending in the longitudinal direction of the housing 10. Said chamber merges in the lower region or in an end region into a valve chamber 12. This, in turn, forms a nozzle opening or a (short) nozzle duct 13 at the free or lower end. The medium, that is to say in particular glue, emerges from said nozzle duct when the valve is open.

The emergence of the material or glue from the nozzle is controlled by an actuating member which can be moved at a high-frequency, specifically by an actuator 14 made from magnetostrictive material. The elongated, preferably cylindrical, that is to say rod-shaped actuator 14 extends in the longitudinal direction of the housing 10. To open the valve, the actuator 14 is contracted, that is to say shortened with regard to the effective length. To close the valve, the actuator 14 is extended by a magnetic field acting thereon.

Provided as the direct closure member 15 of the valve is a ball which is pressed by the actuator 14 against an internal opening of the nozzle duct 13. A surface acting as valve seat and corresponding to the shape of the closure member 15 is formed in this region. The free end of the actuator 14 is provided with a trough-shaped depression in which the ball-shaped closure member 15 rests.

The actuator 14 is surrounded by a coil 16 in order to generate an alternating, cyclically generated magnetic field. A neutral interlayer, for example made from paper, is arranged between the actuator 14 and coil 16. The coil 16 is wound around the actuator 14. An electric line 17 leads to the coil 16 and is connected to the housing 10 via a plug 18 with a screw fixing.

One particularity consists in that the actuator is assigned a further, second magnet, specifically a permanent magnet 19. The latter is configured as a sleeve-shaped structure, and surrounds the actuator 14 and the coil 16 concentrically. The permanent magnet 19 generates a permanent magnetic field which leads to an extension of the actuator 14, thus to a closed position of the valve, in accordance with the representation in FIG. 1. Accordingly, when only the permanent magnet 19 is active, the valve is in the closed position. By energizing the coil 16, the effect of the permanent magnet 19 is cancelled or compensated, with the result that virtually no magnetic field acts on the actuator. The latter contracts to normal size. The shortening of the actuator 14 thereby produced moves the valve into an open position, and the closure member 15 is accordingly retracted from the nozzle opening or the nozzle duct 13. The result of this is that cyclical, pulsing energization of the coil 16 opens the valve, and that when no power is supplied the valve is closed or held in the closed position by the permanent magnet 19. The permanent magnet 19 and coil 16 have corresponding dimensions in the longitudinal direction in this case.

The unit formed from the actuator 14, coil 16 and permanent magnet 19 is sheathed, specifically in the region of the coil and permanent magnet 19. A cylindrical sheath 20 made from insulating, castable material sheaths the permanent magnet 19 along its entire length and sealingly adjoins the actuator 14 with end walls 21, 22. The sheath 20 consists of a permanently elastic, insulating material which is castable in the initial state and can therefore be brought into the indicated shape of the sheath 20. A silicone-like compound is particularly suitable as sheath 20.

It is important for the particular mounting or holding of the actuator 14 to be such that temperature-induced changes in length of the actuator remain without effect on the magnetic actuation. Changes in length because of temperature fluctuations take place within longer periods. The actuator 14 is therefore mounted or held such that the temperature-induced change in length occurring during a longer period can take place, but is nevertheless adequately supported in the case of high-frequency, magnetically effected changes in length.

The (upper) end of the actuator remote from the closure member 15 is mounted for this purpose in a holding block 23 which is of large volume or forms a large mass. The actuator 14 enters by the end into a cutout in the holding block 23, and is anchored therein, for example by adhesive bonding. The holding block 23 is seated in a depression 24 in the housing 10, and can be freely moved in this depression 24. During the high-frequency opening and closing movements of the actuator, the holding block 23 forms a firm, immovable support for said actuator. Because of the magnetic fields, the actuator 14 can be moved so as to produce a tight, closed position in the region of the nozzle duct 13. In this case, the holding block 23 forms a firm support despite being movable in principle.

If, by contrast, changes in length proceed over a longer period, that is to say for example in the case of temperature effects, the holding block 23 is displaced by the actuator 14, which slowly extends or contracts. The supporting effect for the actuator 14 is maintained nevertheless.

The holding block can be displaced against elastic resistance in the case of lengthening of the actuator 14. In the present exemplary embodiment, provision is made of a compression spring 25 which is arranged centrally and is supported, on the one hand, in a cutout in the holding block 23 and, on the other hand, in a cutout in an upper closure plate 26 of the housing 10. The closure plate 26 can be removed—by means of screws—and permits access to the interior of the valve or the housing 10.

The valve is also specially constructed in the region of the nozzle opening and/or of the nozzle duct 13. A nozzle insert 27 is inserted into the housing 10 by means of a screwed connection 28. The nozzle insert 27 projects with a head 29 from the housing 10. The nozzle duct 13 is located in the region of the head 29. The nozzle insert forms the valve chamber 12, which leads as far as the magnet 16, 19 and/or as far as the sheath 20.

A glue duct 30 for feeding the glue to the valve chamber 12 runs angularly in the housing 10 and opens in an annular duct 31 thereof. Said annular duct runs around the nozzle insert 27. Radially directed bores 32 lead from the annular duct 31 in the radial direction into the valve chamber 12. A plurality of bores 32 are arranged distributed along the circumference.

Seals, specifically O-rings 33, 34, are provided above and below the annular duct 31. This prevents glue from emerging in the region between the nozzle insert 27 and housing 10.

The holding block 23 can execute limited movements in the depression 24. When the head 29 is removed from the valve housing 10, the actuator 14 remains inside the housing 10. The holding block 23 comes to bear against the boundary of the depression 24. The unit formed from the coil 16, permanent magnet 19 and sheath 20 also remains in the position shown, because of the smaller cross section of the inner chamber 11 in the region of the head 29. The said units are mounted via the access to the interior of the housing 10, which can be released by means of the closure plate 26.

Instead of the holding block 23, an inertial movable mass can also be arranged as a holder for the actuator at another point. In particular, it is possible to provide as inertial mass a cylindrical sleeve which concentrically surrounds the actuator 14 and is connected to the free end thereof.

The valve can also be configured such that the permanent magnet 19 simultaneously takes over the function of the inertial, movable holder for the actuator 14. It is also possible for the permanent magnet to be positioned functionally as inertial mass at the free end of the actuator.

The independence of the high-frequency control movements of the actuator 14 from temperature fluctuations can also be achieved in another way than by the holding block 23. For example, the actuator can be connected to a piston which in the course of slow extensions presses a medium from one chamber into another via a narrow duct and/or with great resistance.

What is claimed is:

1. A valve having an actuator (14) made from magnetostrictive material for actuating a closure member (15) at high-frequency, and having a magnetic field generator (16) assigned to the actuator, characterized in that:

the actuator (14) is connected to a holder which can be moved with high inertia;

the magnetic field generator is a coil (16); and the actuator (14) is assigned the coil (16) for generating a pulsing magnetic field; and also is assigned a permanent magnet (19) for generating a permanent magnetic field, in such a way, that upon excitation of the coil (16), the actuator moves the closure member (15) into an open position.

2. The valve according to claim 1, characterized in that the coil (16) and permanent magnet (19) concentrically surround the actuator (14) along a fraction of a length thereof, so that the coil (16) directly surrounds the actuator (14), and the permanent magnet (19) surrounds the coil (16) as a cylindrical sleeve.

3. The valve according to claim 1, characterized in that, for the purpose of forming an impervious, closed unit, the coil (16) for generating a pulsating magnetic field and/or the permanent magnet (19) are surrounded by a sheath (20) which is connected to the actuator (14) and consists of a neutral, elastic material.

4. A valve having an actuator (14) made from magnetostrictive material for actuating a closure member (15) at high-frequency and having a magnetic field generator (16) assigned to the actuator, characterized in that:

the actuator (14) is connected to a holder which can be moved with high inertia;

a nozzle head (29) is introduced as an insert into a housing (10), and forms in an interior of the head a valve chamber (12) with a nozzle opening and/or nozzle duct (13); and a glue duct (30) opens into the valve chamber (12).

5. A valve comprising:

an elongated actuator (14) arranged in a housing (10) for the actuation of a closure member (15) at high frequency; and a magnetic field generator (16) assigned to the actuator and made of a magnetostrictive material, characterized in that:

a) the actuator (14) is directly excitable by a magnetic field generated by said generator;

b) the elongated actuator (14) has an end, averted from the closure member (15), which is connected to an inertial body (23) of relatively large mass; and c) the inertial body (23) is arranged in a depression (24) of the housing and is displaceable by changes in length of the elongated actuator (14) due to thermal conditions.

6. The valve according to claim 5, characterized in that the inertial body is a holding block (23) that is movable against elastic pressure of a compression spring (24) when the length of the elongated actuator (14) changes due to thermal conditions.

7. The valve according to claim 5, characterized in that, when the closure member (15) is in a closed position, the inertial body (23) maintains, within the depression (24), a space from the housing (10) at the side facing the actuator (14) and at the side opposite thereto.

8. The valve according to claim 5, characterized in that:

the magnetic field generator is an electric field coil;

the actuator (14) is surrounded by the electric field coil (16) for generating a pulsing magnetic field; and a permanent magnet (19), which surrounds the coil (16), generates a permanent magnetic field in such a way that, upon excitation of the coil (16), the actuator (14) moves the closure member (15) into an open position.

9. The valve according to claim 8, characterized in that the coil (16) and the permanent magnet (19) surround the elongated actuator (14), in a partial region of the length thereof, as concentric sleeves.

10. The valve according to claim 5, characterized in that, for the purpose of forming an impervious, closed unit, the coil (16) and/or the permanent magnet (19) are surrounded by a sheath (20) which sealably adjoins the actuator outside the coil (16) and permanent magnet (19), and which comprises a neutral, elastic material.

11. The valve according to claim 5, characterized in that a nozzle head (29) is introduced as an insert into the housing (10) and forms inside the head (29) a valve chamber (12) with a nozzle opening or nozzle duct (13), and in that a glue duct (30) opens into the valve chamber (12).

12. The valve according to claim 11, characterized in that the glue duct (30) is connected to an annular duct (31) which surrounds the head (29), and which opens into the valve chamber (12) with radially directed bores (32).

* * * * *